United States Patent [19]

Yamamoto et al.

[11] Patent Number: 5,055,353
[45] Date of Patent: Oct. 8, 1991

[54] MAGNETO-OPTICAL RECORDING MEDIUM

[75] Inventors: Ryoichi Yamamoto; Shizuo Umemura; Kiichi Kato; Takashi Yamada, all of Kanagawa, Japan

[73] Assignee: Fuji Photo Film Co., Ltd., Kanagawa, Japan

[21] Appl. No.: 523,410

[22] Filed: May 15, 1990

[30] Foreign Application Priority Data

May 16, 1989 [JP] Japan .................................. 1-122348
Jun. 26, 1989 [JP] Japan .................................. 1-163393

[51] Int. Cl.$^5$ .............................................. G11B 7/24
[52] U.S. Cl. .................................... 428/336; 428/457; 428/472; 428/694; 428/698; 428/900; 428/928
[58] Field of Search ............... 428/336, 457, 694, 900, 428/928, 472, 698; 360/131, 135; 365/122; 369/288

[56] References Cited

U.S. PATENT DOCUMENTS

| | | | |
|---|---|---|---|
| 4,466,035 | 8/1984 | Connell et al. | 365/122 |
| 4,693,943 | 9/1987 | Kishi et al. | 428/694 |
| 4,717,628 | 1/1988 | Takahashi et al. | 428/694 |
| 4,725,502 | 2/1988 | Kiyomiya et al. | 428/694 |
| 4,786,559 | 11/1988 | Murakami et al. | 428/694 |
| 4,801,499 | 1/1989 | Aoyama et al. | 428/694 |

FOREIGN PATENT DOCUMENTS 5587332 of 0000 Japan .
57120253 of 0000 Japan .
152043 6/1988 Japan .

OTHER PUBLICATIONS

Ohta, K. et al., "Study on High Reliability of a Magnetooptic Medium with a Multilayer-Structure", J. Appl. Elect., vol. 8, No. 2 (1984), pp. 93-96.
Keay, D. et al., "Longitudinal Kerr Magnetooptic Effect in Multilayer Structures of Dielectric and Magnetic Films," Optica Acta, vol. 15, No. 4 (1968), pp. 373-378.

Primary Examiner—Merrell C. Cashion, Jr.
Attorney, Agent, or Firm—Sixbey, Friedman, Leedom & Ferguson

[57] ABSTRACT

A magneto-optical recording medium comprises a substrate and a magneto-optical recording film overlaid on the substrate. The magneto-optical recording film is composed of a first protective dielectric layer, a recording layer, a second protective dielectric layer, and a reflection metal layer, which layers are overlaid in this order on the substrate. The thickness of the first protective dielectric layer falls within the range of 950 Å to 1,300 Å. The thickness of the recording layer falls within the range of 200 Å to 400 Å. The thickness of the second protective dielectric layer falls within the range of 100 Å to 600 Å. The thickness of the reflection metal layer falls within the range of 200 Å to 800 Å.

10 Claims, 1 Drawing Sheet

MAGNETO-OPTICAL RECORDING MEDIUM

BACKGROUND OF THE INVENTION

1. Field of the Invention

This invention relates to a magneto-optical recording medium. This invention particularly relates to a magneto-optical recording medium which reflects light such that little difference in phase of the reflected light occurs, whereby elliptic polarization of the reflected light is minimized and fluctuation in the C/N ratio among apparatuses for driving the magneto-optical recording medium is reduced.

2. Description of the Prior Art

In recent years, magneto-optical recording media have been used widely in the form of magneto-optical disks, which are used for large-capacity information storage or the like and which enable the writing and reading of information with a laser beam.

In general, a magneto-optical recording medium comprises a transparent substrate, which is constituted of a resin such as polycarbonate, glass, or the like, and a magneto-optical recording film overlaid on the substrate. The magneto-optical recording film comprises protective dielectric layers and a recording layer which are formed with a vacuum film-forming process, for example, a sputtering process.

The recording layer is constituted of an amorphous alloy which mainly contains a rare earth metal, such as Tb, Nd, Dy, or Gd, and a transition metal, such as Fe, or Co.

Ordinarily, protective dielectric layers are provided in order to protect the recording layer and enhance its characteristics.

In order for the magneto-optical recording film to exhibit high sensitivity and a high C/N ratio, the magneto-optical recording film is composed of three layers. Specifically, in cases where light is irradiated to a magneto-optical recording medium from the side of the substrate during the reading of information from the magneto-optical recording medium, a first protective dielectric layer, a recording layer, and a second protective dielectric layer are overlaid in this order on the substrate. Such a configuration enhances the Kerr rotation angle through multiple beam interference occurring at the first protective dielectric layer.

Also, as disclosed in, for example, Japanese Unexamined Patent Publication Nos. 55(1980)-87332 and 57(1982)-120253, it has been proposed to employ a reflection layer type of magneto-optical recording medium in order to obtain a good recording bit pattern and keep the C/N ratio high. By way of example, the reflection layer type of magneto-optical recording medium comprises a magneto-optical recording film composed of three layers as described above, and a reflection metal layer overlaid as a top layer on the side opposite to the substrate.

In general, when light impinges upon a magneto-optical recording medium and is reflected therefrom, the Kerr effect occurs. Specifically, the plane of polarization of the light rotates by a certain angle (a Kerr rotation angle), and the reflected light becomes polarized elliptically. This is because, when light is reflected from the magneto-optical recording medium, a phase difference $\Phi$ occurs with the reflected light.

If a phase difference occurs with the reflected light, the carrier output and the C/N ratio will decrease.

As described above, a phase difference occurs when light is reflected from a magneto-optical recording medium. A difference in phase of reflected light is also caused to occur by an optical element of a pickup device of an apparatus which drives a magneto-optical recording medium. Specifically, a pickup device is provided with a reflection optical element, such as a 45-degree mirror or a beam splitter, which guides light reflected from a magneto-optical recording medium. The reflection surface of the reflection optical element is ordinarily constituted of a plurality of dielectric layers, which cause a difference in phase to occur with light reflected therefrom.

A phase difference $\delta$ of the reflected light, which phase difference is caused to occur by an optical element of a pickup device, varies largely among pickup devices. Therefore, even if the same magneto-optical recording medium is used, the C/N ratio obtained will vary, depending on the apparatus which drives the magneto-optical recording medium.

The variance in the C/N ratio among the drive apparatuses increases as the phase difference $\Phi$ of the reflected light, which phase difference is caused to occur by a magneto-optical recording medium, is larger.

Specifically, in general, the phase difference $\delta$ of the reflected light, which phase difference is caused to occur by an optical element of a pickup device, takes one of various values around zero degree. When the phase difference $\Phi$ of the reflected light, which phase difference is caused to occur by a magneto-optical recording medium, is closer to zero degree, the variance in the C/N ratio among pickup devices becomes smaller.

Therefore, in order for the problem with regard to the variance in the C/N ratio among the drive apparatuses to be eliminated, it is important that the phase difference $\Phi$ of the reflected light, which phase difference is caused to occur by a magneto-optical recording medium, be minimized.

However, any means efficient for minimizing the phase difference $\Phi$ of the reflected light has not heretofore been proposed.

SUMMARY OF THE INVENTION

The primary object of the present invention is to provide a magneto-optical recording medium which causes little difference in phase to occur with light reflected therefrom and which thus eliminates the problem in that the C/N ratio obtained varies, depending on the apparatus which drives the magneto-optical recording medium.

Another object of the present invention is to provide a magneto-optical recording medium which has good sensitivity and the sensitivity of which does not very fluctuate, depending on the speed at which it is rotated.

A further object of the present invention is to provide a magneto-optical recording medium which has good durability.

A still further object of the present invention is to provide a magneto-optical recording medium which has good sensitivity, a large figure of merit (i.e. a high C/N ratio), and good durability.

The present invention provides a magneto-optical recording medium comprising a substrate and a magneto-optical recording film overlaid on said substrate, said magneto-optical recording film being composed of a first protective dielectric layer, a recording layer, a second protective dielectric layer, and a reflection metal layer, which layers are overlaid in this order on said substrate, wherein the thickness of said first protective dielectric layer falls within the range of 950Å to 1,300Å the thickness of said recording layer falls within the range of 200Å to 400Å, the thickness of said second protective dielectric layer falls within the range of 100Å to 600Å, and the thickness of said reflection metal layer falls within the range of 200Å to 800Å.

With the magneto-optical recording medium in accordance with the present invention, the magneto-optical recording film is composed of a first protective dielectric layer, a recording layer, a second protective dielectric layer, and a reflection metal layer, which layers are overlaid in this order on the substrate. The thickness of the first protective dielectric layer falls within the range of 950Å to 1,300Å. The thickness of the recording layer falls within the rang of 200Å to 400Å. The thickness of the second protective dielectric layer falls within the range of 100Å to 600Å. Also, the thickness of the reflection metal layer falls within the range of 200Å to 800Å. Therefore, with the magneto-optical recording medium in accordance with the present invention, little difference in phase occurs with light reflected therefrom, and the reflected light can be prevented from becoming polarized elliptically. Accordingly, the problem can be eliminated in that the C/N ratio obtained varies, depending on the apparatus which drives the magneto-optical recording medium.

In an embodiment of the magneto-optical recording medium in accordance with the present invention, the thickness of the second protective dielectric layer falls within the range of 100Å to 300Å. Such an embodiment of the magneto-optical recording medium in accordance with the present invention has good sensitivity and a comparatively good durability. Also, the sensitivity of the magneto-optical recording medium does not very fluctuate, depending on the speed at which it is rotated.

In another embodiment of the magneto-optical recording medium in accordance with the present invention, the thickness of the recording layer falls within the range of 200Å to 300Å. Such an embodiment of the magneto-optical recording medium in accordance with the present invention has good durability and good sensitivity, and exhibits a high C/N ratio.

DETAILED DESCRIPTION OF THE INVENTION

With the magneto-optical recording medium in accordance with the present invention, the magneto-optical recording film is composed of the four layers: the first protective dielectric layer, the recording layer, the second protective dielectric layer, and the reflection metal layer. Also, the thicknesses of the four layers are set to values falling within the specific ranges. Therefore, the absolute value of the phase difference, which occurs with light reflected from the magneto-optical recording medium due to rotation of the plane of polarization of the reflected light, can be kept small (for example, smaller than 15 degrees). Accordingly, the reflected light can be prevented from becoming polarized elliptically, and the carrier output can be kept high.

Consequently, the problem can be eliminated in that the C/N ratio obtained varies, depending on the apparatus which drives the magneto-optical recording medium.

In general, when light impinges upon a magneto-optical recording medium and is reflected therefrom, the Kerr effect occurs. Specifically, the plane of polarization of the light rotates, and the reflected light becomes polarized elliptically. The amplitude reflectance (rx) of the component having the plane of polarization lying along the direction of incident light and the amplitude reflectance (ry) of the component having the plane of polarization intersecting perpendicularly to the direction of incident light are expressed as $$rx = |rx| \exp(i\Phi x)$$

$$ry = |ry| \exp(i\Phi y)$$

The phase difference $\Phi$ of the reflected light is expressed as $$\Phi = \Phi y - \Phi x$$

Put $\tan\alpha = |rx|/|ry|$: then the Kerr rotation angle ($\theta k$) and the Kerr ellipticity ($\eta k$) are expressed as $$\tan(2\theta k) = \tan(2\alpha)\cos(\Phi)$$

$$\tan(2\eta k) = \tan(2\alpha)\sin(\Phi)$$

Therefore, if the phase difference $\Phi$ of the reflected light increases, which phase difference is caused to occur by the magneto optical recording medium, the Kerr rotation angle will decrease.

Also, in general, a pickup device for a magneto-optical recording medium is provided with a reflection optical element, such as a 45-degree mirror or a beam splitter, which guides light reflected from a magneto-optical recording medium. The reflection surface of the reflection optical element causes a phase difference $\delta$ to occur between the P-polarized light component and the S-polarized light component (i.e. the components of light reflected from the magneto-optical recording medium, which have been polarized along the x and y directions). In such cases, the Kerr rotation angle $\Theta$ and the Kerr ellipticity H of the light ultimately received by the pickup device are expressed as $$\tan 2\Theta = \tan(2\alpha)\cos(\Phi-\delta)$$

$$\tan 2H = \tan(2\alpha)\sin(\Phi-\delta)$$

Figure 1:
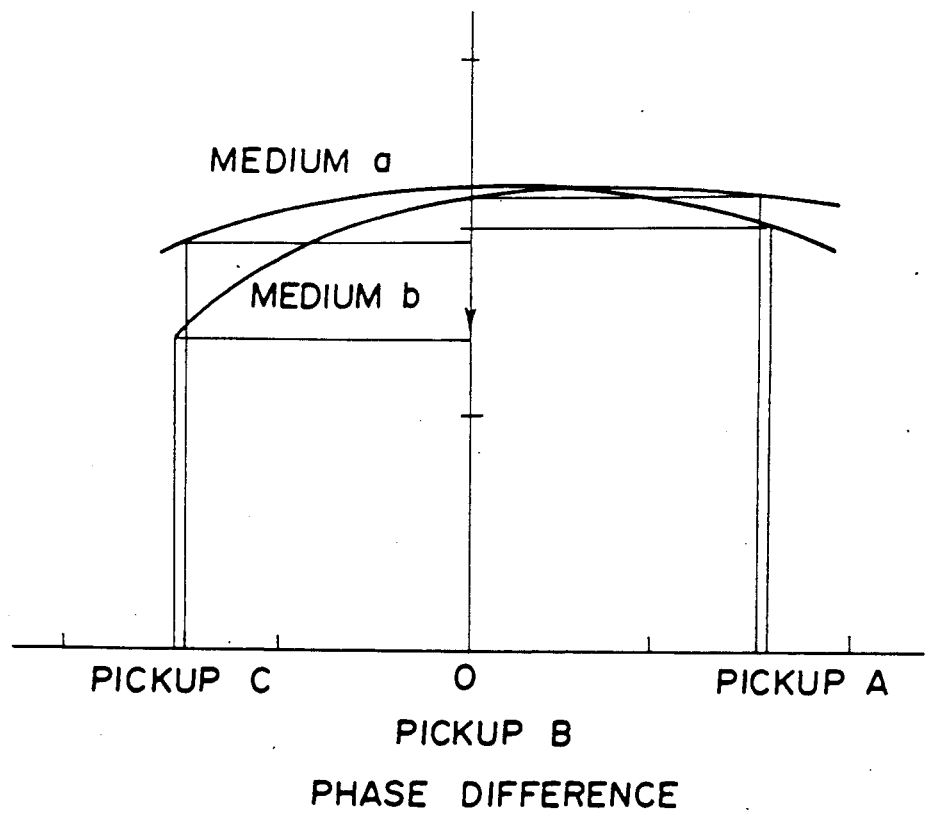
FIG. 1 is a graph showing how the C/N ratios of magneto-optical recording media decrease depending on a phase difference $\delta$ of the reflected light, which phase difference is caused to occur by an optical element of a pickup device.

FIG. 1 is a graph showing how the C/N ratios of magneto-optical recording media decrease depending on the phase difference $\delta$ of the reflected light, which phase difference is caused to occur by an optical element of a pickup device. In FIG. 1, a magneto-optical recording medium a causes little difference in phase ($\Phi$) to occur with light reflected therefrom. A magneto-optical recording medium b causes a large difference in phase ($\Phi$) to occur with light reflected therefrom. Pickup devices A, B, and C cause the phase difference $\delta$ of the reflected light to occur to different extents even when the same magneto-optical recording medium is used. When the magneto-optical recording medium a is operated with each of the pickup devices A, B, and C, the C/N ratio does not very decrease, nor does it very change among the pickup devices A, B, and C. When the magneto-optical recording medium b is operated with the pickup device C, the phase difference Φ and the phase difference δ of the reflected light cancel each other, and therefore little decrease in the C/N ratio occurs. However, when the magneto-optical recording medium b is operated with the pickup device B, the phase difference Φ and the phase difference δ of the reflected light are added together, and therefore a large decrease in the C/N ratio occurs.

In general, the phase difference δ of the reflected light, which phase difference is caused to occur by an optical element of a pickup device, takes one of various values around zero degree. Accordingly, when the phase difference Φ of the reflected light, which phase difference is caused to occur by a magneto-optical recording medium, is closer to zero degree, the variance in the C/N ratio among pickup devices becomes smaller.

The magneto-optical recording medium in accordance with the present invention is provided with a magneto-optical recording film which causes little difference in phase to occur with light reflected therefrom. Therefore, with the magneto-optical recording medium in accordance with the present invention, the problem can be eliminated in that the C/N ratio obtained varies, depending on the apparatus which drives the magneto-optical recording medium.

The thickness of the first protective dielectric layer of the magneto-optical recording medium in accordance with the present invention falls within the range of 950Å to 1,300Å. Therefore, the variance in the phase difference of the reflected light, depending on a change in the thickness of the magneto-optical recording film, can be kept small. Accordingly, the magneto-optical recording medium in accordance with the present invention exhibits stable characteristics.

The magneto-optical recording medium in accordance with the present invention comprises the transparent substrate, which is constituted of a resin such as polycarbonate, glass, or the like, and the magneto-optical recording film overlaid on the substrate. The magneto-optical recording film can be prepared from an operation wherein the first protective dielectric layer, the recording layer, the second protective dielectric layer, and the reflection metal layer are overlaid in this order on the substrate with a vacuum film-forming process, for example, a sputtering process.

The thickness of the recording layer falls within the range of 200Å to 400Å. If the thickness of the recording layer is smaller than 200Å, the durability of the magneto-optical recording medium will become low. If the thickness of the recording layer is larger than 400Å, the phase difference of the reflected light, which phase difference is caused to occur by the magneto-optical recording film, will become large.

The thickness of the second protective dielectric layer falls within the range of 100Å to 600Å. If the thickness of the second protective dielectric layer is smaller than 100Å, the sensitivity of the magneto-optical recording medium will become low. If the thickness of the second protective dielectric layer is larger than 600Å, the absolute value of the phase difference Φ of the reflected light, which phase difference is caused to occur by the magneto-optical recording film, will become large (for example, larger than 15 degrees), and the objects of the present invention cannot be accomplished.

In order for a high reflectivity to be obtained, the reflection metal layer of the magneto-optical recording medium in accordance with the present invention should preferably be constituted of Al or Au (gold). For the sake of economy, the reflection metal layer should preferably be constituted of Al or an alloy thereof. In order for the magneto-optical recording film to exhibit good weatherability, the reflection metal layer should preferably be constituted of an alloy of Al with Ta or Ti.

The thickness of the reflection metal layer falls within the range of 200Å to 800Å. If the thickness of the reflection metal layer is smaller than 200Å, the absolute value of the phase difference of the reflected light will become large. If the thickness of the reflection metal layer is larger than 800Å, the heat capacity of the magneto-optical recording medium will become large, and the sensitivity of the magneto-optical recording medium will become low. Also, a high material cost will be required, and a long time will be taken for the magneto-optical recording medium to be manufactured.

The recording layer of the magneto-optical recording film of the magneto-optical recording medium in accordance with the present invention may be constituted of various magnetic oxide materials and magnetic metal materials: for example, crystalline materials such as MnBi, MnAlGe, and MnCuBi; single crystal materials such as GdIG, BiSmErGaIG, and BiSmYbCoGeIG; and amorphous materials such as GdCo, GdFe, TbFe, DyFe, GdFeBi, GdTbFe, GdFeCo, TbFeCo, and TbFeNi. From the viewpoint of sensitivity and the C/N ratio, the recording layer should preferably be constituted of, principally, rare earth metals and transition metals. Particularly, from the viewpoint of sensitivity, the C/N ratio, and weatherability, the recording layer should most preferably be constituted of the amorphous TbFeCoCr alloy.

The first protective dielectric layer overlaid on the substrate has the Kerr enhancement effects on the recording layer. The second protective dielectric layer overlaid on the recording layer protects it.

The first protective dielectric layer and the second protective dielectric layer may be constituted of oxides, nitrides, and sulfides: for example, $SiO_x$, $SiN_x$, $AlN_x$, and ZnS. From the viewpoint of the optical characteristics and the protective function, nitrides of Si, nitrides of Al, and mixtures of these nitrides are preferable.

The refractive indexes of the first protective dielectric layer and the second protective dielectric layer should preferably fall within the range of 2.0 to 2.3.

The layers which constitute the magneto-optical recording film are formed with a vacuum film-forming process, for example, a sputtering process, an ion plating process, or a vacuum evaporation process, among which the sputtering process, such as a magnetron sputtering process, is preferable.

The substrate of the magneto-optical recording medium in accordance with the present invention may be constituted of a polycarbonate resin, a polymethyl methacrylate resin, an epoxy resin, glass, or the like. In order for the magneto-optical recording medium in accordance with the present invention to have its largest effects, the substrate should preferably be constituted of a polycarbonate resin, a polymethyl methacrylate resin, or an epoxy resin.

Among the above-enumerated resins for the substrate, a polycarbonate resin is advantageous in that it absorbs little moisture and has a high glass transition point.

The upper surface and the side surface of the magneto-optical recording film of the magneto-optical recording medium in accordance with the present invention may be covered with a protective layer constituted of an organic resin, such as an ultraviolet-curing resin.

Also, the magneto-optical recording medium in accordance with the present invention may take on the form of a double-faced type of magneto-optical recording medium. Specifically, two magneto-optical recording media in accordance with the present invention may be laminated via an adhesive layer such that their substrates face outward and their reflection metal layers face each other via the adhesive layer. The adhesive layer may be constituted of a hot-melt adhesive.

In a first embodiment of the magneto-optical recording medium in accordance with the present invention, the thickness of the second protective dielectric layer falls within the range of 100Å to 300Å. The first embodiment of the magneto-optical recording medium in accordance with the present invention is advantageous in that its sensitivity does not very fluctuate, depending on the speed at which it is rotated. Also, the first embodiment has good sensitivity and a comparatively good durability.

The first embodiment of the magneto-optical recording medium in accordance with the present invention will further be illustrated by the following nonlimitative examples.

EXAMPLE 1

A 130mm-diameter, 1.2 mm-thick polycarbonate substrate having a guide groove on one surface was prepared with an injection molding process. A magneto-optical recording film was then overlaid in the manner described below on the surface of the polycarbonate substrate, which surface had the guide groove.

The substrate was set on a rotatable substrate holder of a sputtering apparatus. An argon gas atmosphere having a pressure of 1 mmTorr was then formed in a film forming chamber of the sputtering apparatus, and a magnetron sputtering process was carried out by feeding a radio-frequency power of 1.0kW to targets. First, an $SiN_x$ layer serving as a first protective dielectric layer was overlaid to a thickness of 950Å on the substrate. Thereafter, a TbFeCoCr recording layer was overlaid to a thickness of 300Å on the first protective dielectric layer. An $SiN_x$ layer serving as a second protective dielectric layer was then overlaid to a thickness of 200Å on the recording layer. Thereafter, an AlTa alloy layer containing Ta in a proportion of 2 atom % and serving as a reflection metal layer was overlaid to a thickness of 350Å on the second protective dielectric layer. In this manner, the magneto-optical recording film was overlaid on the substrate.

Thereafter, a coating composition, which contained an ultraviolet-curing resin, was applied to the upper surface and the side surface of the magneto-optical recording film with a spin coating process at 3,000 rpm for 20 seconds. Ultraviolet rays having an intensity of 100 mW/cm² were then irradiated for one minute to the layer of the ultraviolet-curing resin in order to cure it. In this manner, a protective organic resin layer having a thickness of 10μm was formed. The ultraviolet-curing resin used was #SD-17 supplied by Dainippon Ink and Chemicals, Inc.

Two samples of magneto-optical recording media were prepared in the manner described above. A hot-melt adhesive (#XW-13 supplied by Toagosei Chemical Industry Co., Ltd.), which was molten at a temperature of 130° C., was applied to a thickness of 10μm to each of the parts of the protective organic resin layers located on the upper surfaces of the magneto-optical recording films of the two magneto-optical recording media. A roll coater was used for this purpose. The two magneto-optical recording media were then laminated under pressure via the hot-melt adhesive layers such that the reflection metal layers faced each other and the substrates faced outward. In this manner, a sample of a double-faced type of magneto-optical recording medium was made.

EXAMPLE 2

A sample of a double-faced type of magneto-optical recording medium was made in the same manner as that in Example 1, except that the thickness of each first protective dielectric layer was set to 1,100Å.

EXAMPLE 3

A sample of a double-faced type of magneto optical recording medium was made in the same manner as that in Example 1, except that the thickness of each first protective dielectric layer was set to 1,300Å.

COMPARATIVE EXAMPLE 1

A sample of a double-faced type of magneto-optical recording medium was made in the same manner as that in Example 1, except that the thickness of each first protective dielectric layer was set to 900Å.

COMPARATIVE EXAMPLE 2

A sample of a double-faced type of magneto-optical recording medium was made in the same manner as that in Example 1, except that the thickness of each first protective dielectric layer was set to 1,350Å.

For each of the samples of the double-faced type of magneto-optical recording media obtained in the manner described above, the phase difference Φ of light reflected from a magneto-optical recording medium, which phase difference represents the extent of elliptic polarization of the reflected light, the sensitivity, the C/N ratio, and the fluctuation in the sensitivity, depending on the speed at which the magneto-optical recording medium is rotated, were found in the manner described below.

Phase difference Φ

Figure 2:
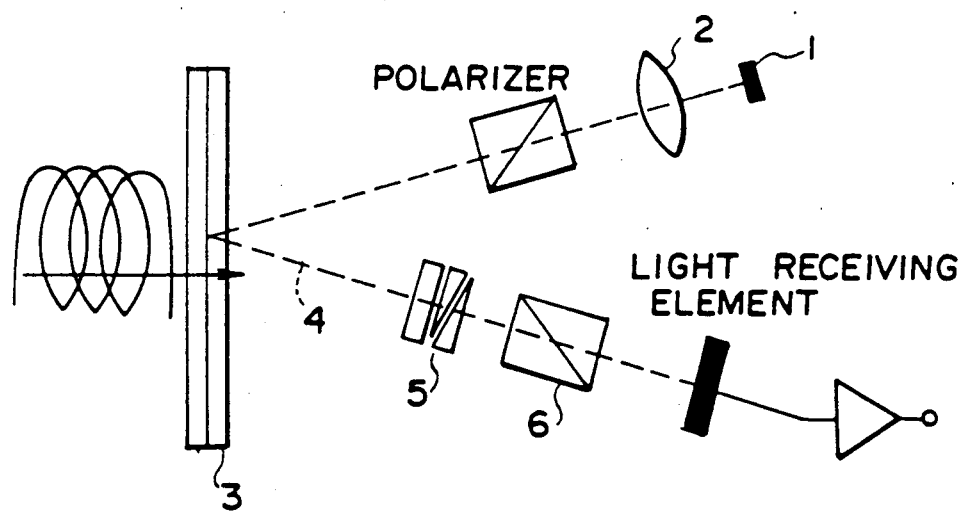
FIG. 2 is a schematic view showing the major part of an apparatus for finding a phase difference $\Phi$ of the reflected light, which phase difference is caused to occur by a magneto-optical recording medium.

In a measuring apparatus shown in FIG. 2, a laser beam was produced by a semiconductor laser 1 and converged by a collimator lens 2 onto a magneto-optical recording medium 3. The laser beam was then reflected from the magneto-optical recording medium 3. (At this time, because of the Kerr effect, the plane of polarization of laser beam 4 reflected from the magneto-optical recording medium 3 rotated by a certain angle, and the reflected laser beam 4 became polarized elliptically. The elliptic polarization of the reflected laser beam 4 was caused to occur by a difference in phase between an amplitude component rx having the plane of polarization lying along the direction of the incident laser beam and an amplitude component ry having the plane of polarization intersecting perpendicularly to the direction of the incident laser beam.) A Babinet-Soleil compensator 5 was placed in the optical path of the reflected laser beam 4 such that the phase advancement axis coincided with the x or y direction, and the difference in phase between the amplitude components rx and ry was compensated for. Also, adjustment was made such that the amount of the laser beam passing through an analyzer 6, which was set in the extinction orientation, became the minimum, and the laser beam which passed through the Babinet-Soleil compensator 5 was converted into linearly polarized light. In this manner, the phase difference of the reflected laser beam 4, which phase difference was caused to occur by the magneto-optical recording medium 3, was compensated for. The amount of compensation was found and taken as the measured value of the phase difference $\Phi$ of the reflected laser beam 4, which phase difference was caused to occur by the magneto-optical recording medium 3.

Sensitivity

In an apparatus for driving a magneto-optical recording medium, the magneto-optical recording medium was rotated at a speed of 1,800 rpm, and information was recorded on the magneto-optical recording medium at a carrier frequency of 3.7 MHz. The write power (Pw), which was required for the C/N ratio to rise was found and taken as the sensitivity.

C/N ratio

A laser beam having a wavelength of 780 nm was used, and the C/N ratio was measured at a rotation speed of a drive apparatus of 1,800 rpm and a carrier frequency of 3.71 MHz. The phase difference of the reflected light, which phase difference was caused to occur by the optical element of a pickup device of the drive apparatus, was set to zero.

Fluctuation in sensitivity, depending on the speed at which the magneto-optical recording medium is rotated:

A test was carried out to find the difference in the sensitivity ($\Delta Pw$) between when the magneto-optical recording medium was rotated at a speed of 1,800 rpm and when it was rotated at a speed of 2,400 rpm.

Table 1 shows the results of measurement.

TABLE 1

| Sample | $\Phi$ (deg) | Pw (mW) | C/N (dB) | $\Delta Pw$ (mW) |
| --- | --- | --- | --- | --- |
| Example 1 | −4.0 | 3.8 | 48.3 | 0.45 |
| Example 2 | 0.0 | 4.0 | 49.0 | 0.30 |
| Example 3 | −1.0 | 4.2 | 48.8 | 0.20 |
| Comp. Ex. 1 | −8.0 | 3.7 | 48.0 | 0.55 |
| Comp. Ex. 2 | −4.0 | 4.3 | 48.3 | 0.15 |

EXAMPLE 4

A sample of a double-faced type of magneto-optical recording medium was made in the same manner as that in Example 2, except that the thickness of each recording layer was set to 200Å.

EXAMPLE 5

A sample of a double-faced type of magneto-optical recording medium was made in the same manner as that in Example 2, except that the thickness of each recording layer was set to 400Å.

COMPARATIVE EXAMPLE 3

A sample of a double-faced type of magneto-optical recording medium was made in the same manner as that in Example 2, except that the thickness of each recording layer was set to 150Å.

COMPARATIVE EXAMPLE 4

A sample of a double-faced type of magneto-optical recording medium was made in the same manner as that in Example 2, except that the thickness of each recording layer was set to 450Å.

The characteristics of the samples of the double-faced type of magneto-optical recording media obtained in the manner described above were measured. Table 2 shows the results of measurement.

TABLE 2

| Sample | $\Phi$ (deg) | Pw (mW) | $\Delta Pw$ (mW) |
| --- | --- | --- | --- |
| Example 4 | 14.0 | 3.8 | 0.32 |
| Example 5 | −15.0 | 4.2 | 0.28 |
| Comp. Ex. 3 | 30.0 | 3.7 | 0.35 |
| Comp. Ex. 4 | −23.0 | 4.3 | 0.26 |

EXAMPLE 6

A sample of a double-faced type of magneto-optical recording medium was made in the same manner as that in Example 2, except that the thickness of each second protective dielectric layer was set to 100Å.

EXAMPLE 7

A sample of a double-faced type of magneto-optical recording medium was made in the same manner as that in Example 2, except that the thickness of each second protective dielectric layer was set to 300Å.

COMPARATIVE EXAMPLE 5

A sample of a double-faced type of magneto-optical recording medium was made in the same manner as that in Example 2, except that the thickness of each second protective dielectric layer was set to 75Å.

COMPARATIVE EXAMPLE 6

A sample of a double-faced type of magneto-optical recording medium was made in the same manner as that in Example 2, except that the thickness of each second protective dielectric layer was set to 350Å.

The characteristics of the samples of the double-faced type of magneto-optical recording media obtained in the manner described above were measured. Table 3 shows the results of measurement.

TABLE 3

| Sample | $\Phi$ (deg) | Pw (mW) | $\Delta Pw$ (mW) |
| --- | --- | --- | --- |
| Example 6 | +9.0 | 4.5 | 0.08 |
| Example 7 | −5.0 | 3.5 | 0.90 |
| Comp. Ex. 5 | +13.0 | 5.5 | 0.05 |
| Comp. Ex. 6 | −8.0 | 3.3 | 1.10 |

EXAMPLE 8

A sample of a double-faced type of magneto-optical recording medium was made in the same manner as that in Example 2, except that the thickness of each reflection metal layer was set to 200Å.

EXAMPLE 9

A sample of a double-faced type of magneto-optical recording medium was made in the same manner as that in Example 2, except that the thickness of each reflection metal layer was set to 250Å.

EXAMPLE 10

A sample of a double-faced type of magneto-optical recording medium was made in the same manner as that in Example 2, except that the thickness of each reflection metal layer was set to 450Å.

EXAMPLE 11

A sample of a double-faced type of magneto-optical recording medium was made in the same manner as that in Example 2, except that the thickness of each reflection metal layer was set to 800Å.

COMPARATIVE EXAMPLE 7

A sample of a double-faced type of magneto-optical recording medium was made in the same manner as that in Example 2, except that the thickness of each reflection metal layer was set to 150Å.

COMPARATIVE EXAMPLE 8

A sample of a double-faced type of magneto-optical recording medium was made in the same manner as that in Example 2, except that the thickness of each reflection metal layer was set to 850Å.

The characteristics of the samples of the double-faced type of magneto-optical recording media obtained in the manner described above were measured. Table 4 shows the results of measurement.

TABLE 4

| Sample | Φ (deg) | Pw (mW) | ΔPw (mW) |
|---|---|---|---|
| Example 8 | −15.0 | 3.3 | 0.65 |
| Example 9 | −10.0 | 3.7 | 0.45 |
| Example 10 | +3.0 | 4.3 | 0.20 |
| Example 11 | +3.0 | 4.9 | 0.15 |
| Comp. Ex. 7 | −22.0 | 3.0 | 0.85 |
| Comp. Ex. 8 | +3.0 | 5.3 | 0.10 |

EXAMPLE 12

A sample of a double-faced type of magneto-optical recording medium was made in the same manner as that in Example 2, except that the thickness of each second protective dielectric layer was set to 100Å, and that each reflection metal layer was constituted of an AlTi alloy layer containing Ti in a proportion of 3 atom and had a thickness of 500Å.

EXAMPLE 13

A sample of a double-faced type of magneto-optical recording medium was made in the same manner as that in Example 12, except that the thickness of each second protective dielectric layer was set to 200Å, and that the thickness of each reflection metal layer was set to 500Å.

EXAMPLE 14

A sample of a double-faced type of magneto-optical recording medium was made in the same manner as that in Example 12, except that the thickness of each second protective dielectric layer was set to 300Å, and that the thickness of each reflection metal layer was set to 500Å.

COMPARATIVE EXAMPLE 9

A sample of a double-faced type of magneto-optical recording medium was made in the same manner as that in Example 12, except that the thickness of each second protective dielectric layer was set to 75Å, and that the thickness of each reflection metal layer was set to 500Å.

COMPARATIVE EXAMPLE 10

A sample of a double-faced type of magneto-optical recording medium was made in the same manner as that in Example 12, except that the thickness of each second protective dielectric layer was set to 350Å, and that the thickness of each reflection metal layer was set to 500Å.

The characteristics of the samples of the double-faced type of magneto-optical recording media obtained in the manner described above were measured. Table 5 shows the results of measurement.

TABLE 5

| Sample | Φ (deg) | Pw (mW) | ΔPw (mW) |
|---|---|---|---|
| Example 12 | +5.2 | 4.6 | 0.07 |
| Example 13 | +0.3 | 4.1 | 0.25 |
| Example 14 | −7.0 | 3.4 | 0.90 |
| Comp. Ex. 9 | +8.4 | 5.7 | 0.05 |
| Comp. Ex. 10 | −11.0 | 3.3 | 1.10 |

A second embodiment of the magneto-optical recording medium in accordance with the present invention will hereinbelow be described in detail.

In the second embodiment of the magneto-optical recording medium in accordance with the present invention, the thickness of the recording layer falls within the range of 200Å to 300Å. The second embodiment of the magneto-optical recording medium in accordance with the present invention is advantageous in that the durability and the sensitivity are good, and a high C/N ratio can be obtained.

With the second embodiment of the magneto-optical recording medium in accordance with the present invention, the thicknesses of the respective layers constituting the magneto-optical recording film are set to values falling within the specific ranges. Particularly, the thickness of the first protective dielectric layer falls within the range of 950Å to 1,300Å. Therefore, a high C/N ratio can be obtained. Also, even when the second embodiment of the magneto-optical recording medium in accordance with the present invention is left to stand at a high temperature and a high humidity, the bit error rate (BER), or the like, does not increase. Thus the second embodiment of the magneto-optical recording medium in accordance with the present invention has good durability.

Specifically, with the second embodiment of the magneto-optical recording medium in accordance with the present invention, by virtue of the first protective dielectric layer which has a comparatively large thickness, a high C/N ratio can be obtained consistently. This is presumably because, when the first protective dielectric layer is combined with the other layers having thicknesses falling within the specific ranges, particularly large optical enhancement effects are obtained.

Also, it is thought that the thick first protective dielectric layer reduces the adverse effects of moisture or oligomers which will penetrate through the substrate, hydrolyzates of the substrate, or the like. As a result, the durability of the magneto-optical recording medium can be kept good.

In the second embodiment of the magneto-optical recording medium in accordance with the present invention, the thickness of the recording layer falls within the range of 200Å to 300Å. If the thickness of the recording layer is smaller than 200Å, the durability of the magneto-optical recording medium will become bad. Particularly, the performance will deteriorate markedly at a high temperature and a high humidity. If the thickness of the recording layer is very large, the Kerr rotation angle will decrease, and the reflectivity will increase, so that the performance index of the recording layer will deviate from the desired range.

In the second embodiment of the magneto-optical recording medium in accordance with the present invention, the thickness of the reflection metal layer ( falls within the range of 200Å to 800Å, preferably within the range of 250Å to 450Å.

The second embodiment of the magneto optical recording medium in accordance with the present invention will further be illustrated by the following nonlimitative examples.

EXAMPLE 15

A 130mm-diameter, 1.2mm-thick polycarbonate substrate having a guide groove on one surface was prepared with an injection molding process. A magneto-optical recording film was then overlaid in the manner described below on the surface of the polycarbonate substrate, which surface had the guide groove.

The substrate was set on a rotatable substrate holder of a sputtering apparatus. An argon gas atmosphere having a pressure of 1 mmTorr was then formed in a film forming chamber of the sputtering apparatus, and a magnetron sputtering process was carried out by feeding a radio-frequency power of 1.0kW to targets. First, an $SiN_x$ layer serving as a first protective dielectric layer was overlaid to a thickness of 950Å on the substrate. Thereafter, a $Tb_{21}Fe_{60}Co_{13}Cr_6$ recording layer was overlaid to a thickness of 250Å on the first protective dielectric layer. An $SiN_x$ layer serving as a second protective dielectric layer was then overlaid to a thickness of 350Å on the recording layer. Thereafter, an AlTi alloy layer containing Ti in a proportion of 2 atom % and serving as a reflection metal layer was overlaid to a thickness of 350Å on the second protective dielectric layer. In this manner, the magneto-optical recording film was overlaid on the substrate.

Thereafter, a coating composition, which contained an ultraviolet-curing resin, was applied to the upper surface and the side surface of the magneto-optical recording film with a spin coating process at 3,000 rpm for 20 seconds. Ultraviolet rays having an intensity of 100 mW/cm² were then irradiated for one minute to the layer of the ultraviolet-curing resin in order to cure it. In this manner, a protective organic resin layer having a thickness of 10μm was formed. The ultraviolet-curing resin used was #SD-17 supplied by Dainippon Ink and Chemicals, Inc.

Two samples of magneto-optical recording media were prepared in the manner described above. A hot-melt adhesive (#XW-13 supplied by Toagosei Chemical Industry Co., Ltd.), which was molten at a temperature of 130° C., was applied to a thickness of 10μm to each of the parts of the protective organic resin layers located on the upper surfaces of the magneto-optical recording films of the two magneto-optical recording media. A roll coater was used for this purpose. The two magneto-optical recording media were then laminated under pressure via the hot-melt adhesive layers such that the reflection metal layers faced each other and the substrates faced outward. In this manner, a sample of a double-faced type of magneto-optical recording medium was made.

EXAMPLE 16

A sample of a double-faced type of magneto-optical recording medium was made in the same manner as that in Example 15, except that the thickness of each first protective dielectric layer was set to 1,100Å.

EXAMPLE 17

A sample of a double-faced type of magneto-optical recording medium was made in the same manner as that in Example 15, except that the thickness of each first protective dielectric layer was set to 1,300Å.

COMPARATIVE EXAMPLE 11

A sample of a double-faced type of magneto-optical recording medium was made in the same manner as that in Example 15, except that the thickness of each first protective dielectric layer was set to 850Å.

COMPARATIVE EXAMPLE 12

A sample of a double-faced type of magneto-optical recording medium was made in the same manner as that in Example 15, except that the thickness of each first protective dielectric layer was set to 1,400Å.

For each of the samples of the double-faced type of magneto-optical recording media obtained in the manner described above, the phase difference Φ of light reflected from a magneto-optical recording medium, which phase difference represents the extent of elliptic polarization of the reflected light, the sensitivity, the C/N ratio, and the BER change rate were found in the manner described below.

Phase difference Φ:

In the measuring apparatus shown in FIG. 2, the phase difference Φ of the reflected laser beam 4, which phase difference was caused to occur by the magneto-optical recording medium 3, was found in the same manner as that in Examples 1 to 14. The laser beam having a wavelength of 780nm was used.

Sensitivity:

In an apparatus for driving a magneto-optical recording medium, the magneto-optical recording medium was rotated at a speed of 1,800 rpm, and information was recorded on the magneto-optical recording medium at a carrier frequency of 3.7 MHz. The write power (Pth), which was required for the C/N ratio to rise, was found and taken as the sensitivity.

C/N ratio:

The C/N ratio was measured in the same manner as that in Examples 1 to 14.

BER change rate:

The BER was found before and after the magneto-optical recording medium was stored for 1,500 hours in a vessel kept at a temperature of 80° C. and a relative humidity of 90%. The ratio of the BER found after the storing operation to the BER found before the storing operation was calculated and taken as the BER change rate.

Table 6 shows the results of measurement.

TABLE 6

| Sample | Φ (deg) | Pth (mW) | C/N (dB) | BER change rate (ratio) |
|---|---|---|---|---|
| Example 15 | −8.0 | 3.1 | 49.2 | 1.4 |

TABLE 6-continued

| Sample | Φ (deg) | Pth (mW) | C/N (dB) | BER change rate (ratio) |
|---|---|---|---|---|
| Example 16 | −5.0 | 3.3 | 49.9 | 1.3 |
| Example 17 | −7.0 | 3.5 | 49.7 | 1.3 |
| Comp. Ex. 11 | −10.0 | 3.0 | 48.4 | 1.4 |
| Comp. Ex. 12 | −9.0 | 3.7 | 48.7 | 1.3 |

As will be clear from Table 6, in cases where the thickness of the first protective dielectric layer fell within the range of 950Å to 1,300Å, the phase difference Φ of the reflected light could be kept small, and a high C/N ratio could be obtained. Also, the BER change rate was low, and the durability was good.

EXAMPLE 18

A sample of a double-faced type of magneto-optical recording medium was made in the same manner as that in Example 16, except that the thickness of each recording layer was set to 200Å.

EXAMPLE 19

A sample of a double-faced type of magneto-optical recording medium was made in the same manner as that in Example 16, except that the thickness of each recording layer was set to 250Å.

EXAMPLE 20

A sample of a double-faced type of magneto-optical recording medium was made in the same manner as that in Example 16, except that the thickness of each recording layer was set to 300Å.

COMPARATIVE EXAMPLE 13

A sample of a double-faced type of magneto-optical recording medium was made in the same manner as that in Example 16, except that the thickness of each recording layer was set to 150Å.

COMPARATIVE EXAMPLE 14

A sample of a double-faced type of magneto-optical recording medium was made in the same manner as that in Example 16, except that the thickness of each recording layer was set to 350Å.

The characteristics of the samples of the double-faced type of magneto-optical recording media obtained in the manner described above were measured. Table 7 shows the results of measurement.

The Kerr rotation angle (θk) and the reflectance R of each recording layer of each sample were measured and multiplied with each other. The value obtained from the multiplication was taken a the performance index.

TABLE 7

| Sample | Φ (deg) | Pth (mW) | Figure of merit | BER change rate (ratio) |
|---|---|---|---|---|
| Example 18 | 2.0 | 3.1 | 0.199 | 1.9 |
| Example 19 | −5.0 | 3.3 | 0.196 | 1.3 |
| Example 20 | −8.0 | 3.5 | 0.182 | 1.2 |
| Comp. Ex. 13 | 8.0 | 2.9 | 0.200 | 12.5 |
| Comp. Ex. 14 | −11.0 | 3.7 | 0.161 | 1.2 |

As will be clear from Table 7, in cases where the thickness of the recording layer was smaller than 200Å, the durability became bad, and the BER change rate increased.

Also, in cases where the thickness of the recording layer was comparatively large, the phase difference Φ of the reflected light became comparatively large.

EXAMPLE 21

A sample of a double-faced type of magneto-optical recording medium was made in the same manner as that in Example 16, except that the thickness of each second protective dielectric layer was set to 100Å.

EXAMPLE 22

A sample of a double-faced type of magneto-optical recording medium was made in the same manner as that in Example 16, except that the thickness of each second protective dielectric layer was set to 350Å.

EXAMPLE 23

A sample of a double-faced type of magneto-optical recording medium was made in the same manner as that in Example 16, except that the thickness of each second protective dielectric layer was set to 600Å.

COMPARATIVE EXAMPLE 15

A sample of a double-faced type of magneto-optical recording medium was made in the same manner as that in Example 16, except that the thickness of each second protective dielectric layer was set to 80Å.

COMPARATIVE EXAMPLE 16

A sample of a double-faced type of magneto-optical recording medium was made in the same manner as that in Example 16, except that the thickness of each second protective dielectric layer was set to 650Å.

The characteristics of the samples of the double-faced type of magneto-optical recording media obtained in the manner described above were measured. Table 8 shows the results of measurement.

TABLE 8

| Sample | Φ (deg) | Pth (mW) | C/N (dB) | BER change rate (ratio) |
|---|---|---|---|---|
| Example 21 | 12.0 | 4.3 | 49.5 | 1.3 |
| Example 22 | −5.0 | 3.3 | 50.2 | 1.7 |
| Example 23 | −15.0 | 3.2 | 48.7 | 1.5 |
| Comp. Ex. 15 | 15.0 | 5.5 | 48.2 | 1.5 |
| Comp. Ex. 16 | −18.0 | 3.1 | 47.9 | 1.2 |

EXAMPLE 24

A sample of a double-faced type of magneto-optical recording medium was made in the same manner as that in Example 16, except that the thickness of each reflection metal layer was set to 200Å.

EXAMPLE 25

A sample of a double-faced type of magneto-optical recording medium was made in the same manner as that in Example 16, except that the thickness of each reflection metal layer was set to 250Å.

EXAMPLE 26

A sample of a double-faced type of magneto-optical recording medium was made in the same manner as that in Example 16, except that the thickness of each reflection metal layer was set to 350Å.

EXAMPLE 27

A sample of a double-faced type of magneto-optical recording medium was made in the same manner as that in Example 16, except that the thickness of each reflection metal layer was set to 450Å.

EXAMPLE 28

A sample of a double-faced type of magneto-optical recording medium was made in the same manner as that in Example 16, except that the thickness of each reflection metal layer was set to 800Å.

COMPARATIVE EXAMPLE 17

A sample of a double-faced type of magneto-optical recording medium was made in the same manner as that in Example 16, except that the thickness of each reflection metal layer was set to 150Å.

COMPARATIVE EXAMPLE 18

A sample of a double-faced type of magneto-optical recording medium was made in the same manner as that in Example 16, except that the thickness of each reflection metal layer was set to 900Å.

The characteristics of the samples of the double-faced type of magneto-optical recording media obtained in the manner described above were measured. Table 9 shows the results of measurement.

TABLE 9

| Sample | Φ (deg) | Pth (mW) | C/N (dB) | BER change rate (ratio) |
| --- | --- | --- | --- | --- |
| Example 24 | −14.0 | 2.5 | 48.5 | 1.5 |
| Example 25 | −10.0 | 3.0 | 49.8 | 1.4 |
| Example 26 | −5.0 | 3.3 | 50.2 | 1.3 |
| Example 27 | −3.0 | 3.7 | 49.7 | 1.2 |
| Example 28 | −3.0 | 4.5 | 49.2 | 1.2 |
| Comp. Ex. 17 | −19.0 | 2.2 | 42.1 | 5.7 |
| Comp. Ex. 18 | −3.0 | 5.3 | 49.1 | 1.2 |

EXAMPLE 9

A sample of a double-faced type of magneto-optical recording medium was made in the same manner as that in Example 16, except that the thickness of each second protective dielectric layer was set to 100Å, and that each reflection metal layer was constituted of an AlTa alloy layer containing Ta in a proportion of 5 atom % and had a thickness of 400Å.

EXAMPLE 30

A sample of a double-faced type of magneto-optical recording medium was made in the same manner as that in Example 29, except that the thickness of each second protective dielectric layer was set to 350Å, and that each reflection metal layer was constituted of an AlTa alloy layer containing Ta in a proportion of 5 atom % and had a thickness of 400Å.

EXAMPLE 31

A sample of a double-faced type of magneto-optical recording medium was made in the same manner as that in Example 29, except that the thickness of each second protective dielectric layer was set to 600521, and that each reflection metal layer was constituted of an AlTa alloy layer containing Ta in a proportion of 5 atom and had a thickness of 400Å.

COMPARATIVE EXAMPLE 19

A sample of a double-faced type of magneto-optical recording medium was made in the same manner as that in Example 29, except that the thickness of each second protective dielectric layer was set to 80521, and that the thickness of each reflection metal layer was set to 400A.

COMPARATIVE EXAMPLE 20

A sample of a double-faced type of magneto-optical recording medium was made in the same manner as that in Example 29, except that the thickness of each second protective dielectric layer was set to 650521, and that the thickness of each reflection metal layer was set to 400Å.

The characteristics of the samples of the double-faced type of magneto-optical recording media obtained in the manner described above were measured. Table 10 shows the results of measurement.

TABLE 10

| Sample | Φ (deg) | Pth (mW) | C/N (dB) | BER change rate (ratio) |
| --- | --- | --- | --- | --- |
| Example 29 | 13.0 | 4.4 | 50.1 | 1.3 |
| Example 30 | −4.2 | 3.4 | 50.6 | 1.2 |
| Example 31 | −14.0 | 3.2 | 49.1 | 1.2 |
| Comp. Ex. 19 | −16.0 | 5.5 | 48.7 | 1.4 |
| Comp. Ex. 20 | −17.0 | 3.1 | 48.3 | 1.2 |

We claim:

1. A magneto-optical recording medium comprising a substrate and a magneto-optical recording film overlaid on said substrate, said magneto-optical recording film being composed of a first protective dielectric layer, a recording layer, a second protective dielectric layer, and a reflection metal layer, which layers are overlaid in this order on said substrate,
   wherein the thickness of said first protective dielectric layer falls within the range of 950Å to 1,300Å, the thickness of said recording layer falls within the range of 200Å to 400Å, the thickness of said second protective dielectric layer falls within the range of 100Å to 600Å, and the thickness of said reflection metal layer falls within the range of 200Å to 800Å wherein said reflection metal layer is an Al alloy layer containing Ta and/or Ti.

2. A magneto-optical recording medium comprising a substrate and a magneto-optical recording film overlaid on said substrate, said magneto-optical recording film being composed of a first protective dielectric layer, a recording layer, a second protective dielectric layer, and a reflection metal layer, which layers are overlaid in this order on said substrate,
   wherein the thickness of said first protective dielectric layer falls within the range of 950Å to 1,300Å, the thickness of said recording layer falls within the range of 200Å to 400Å, the thickness of said second protective dielectric layer falls within the range of 100Å to 600Å, and the thickness of said reflection metal layer falls within the range of 200Å to 800Å wherein said recording layer is a TbFeCoCr amorphous alloy layer.

3. A magneto-optical recording medium as defined in claim 2 wherein the thickness of said second protective dielectric layer falls within the range of 100Å to 300Å.

4. A magneto-optical recording medium as defined in claim 2 wherein the thickness of said recording layer falls within the range of 200Å to 300Å.

5. A magneto-optical recording medium as defined in claim 2 or 4 wherein said recording layer is an amorphous alloy layer constituted of at least one kind of rare earth metal and at least one kind of transition metal.

6. A magneto-optical recording medium as defined in claim 2 or 4 wherein said first protective dielectric layer and said second protective dielectric layer are constituted of at least one kind of Si nitride and/or at least one kind of Al nitride.

7. A magneto-optical recording medium as defined in claim 2 or 4 wherein the thickness of said reflection metal layer falls within the range of 250Å to 450Å.

8. A magneto-optical recording medium as defined in claim 2 or 4 wherein said reflection metal layer is an Al alloy layer and has a thickness falling within the range of 250Å to 450Å.

9. A magneto-optical recording medium comprising a substrate and a magneto-optical recording film overlaid on said substrate, said magneto-optical recording film being composed of a first protective dielectric layer, a recording layer, a second protective dielectric layer, and a reflection metal layer, which layers are overlaid in this order on said substrate, wherein the thickness of said first protective dielectric layer falls within the range of 950Å to 1,300Å, the thickness of said recording layer falls within the range of 200Å to 400Å, the thickness of said second protective dielectric layer falls within the range of 100Å to 600Å, and the thickness of said reflection metal layer falls within the range of 250Å to 450Å wherein said reflection metal layer is an Al alloy layer containing Ta and/or Ti.

10. A magneto-optical recording medium comprising a substrate and a magneto-optical recording film overlaid on said substrate, said magneto-optical recording film being composed of a first protective dielectric layer, a recording layer, a second protective dielectric layer, and a reflection metal layer, which layers are overlaid in this order on said substrate, wherein the thickness of said first protective dielectric layer falls within the range of 950Å to 1,300Å, the thickness of said recording layer falls within the range of 200Å to 400Å, the thickness of said second protective dielectric layer falls within the range of 100Å to 600Å, and the thickness of said reflection metal layer falls within the range of 250Å to 450Å wherein said reflection metal layer is an Al alloy layer containing Ta and/or Ti and said recording layer is a TbFeCoCr amorphous alloy layer.

* * * * *